Aug. 22, 1933.  C. F. DEITZ  1,923,712
TOMATO CORING AND PEELING MACHINE
Filed March 22, 1932  4 Sheets-Sheet 1

C. F. Deitz, INVENTOR
BY Victor J. Evans & Co.
ATTORNEY

Aug. 22, 1933.  C. F. DEITZ  1,923,712
TOMATO CORING AND PEELING MACHINE
Filed March 22, 1932   4 Sheets-Sheet 2

C. F. Deitz, INVENTOR
BY Victor J. Evans & Co.
ATTORNEY

Aug. 22, 1933.   C. F. DEITZ   1,923,712
TOMATO CORING AND PEELING MACHINE
Filed March 22, 1932   4 Sheets-Sheet 3
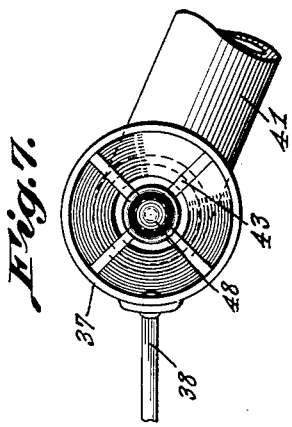
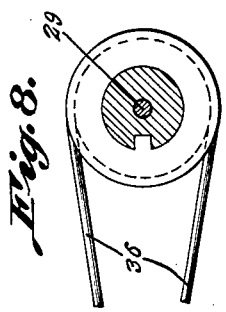
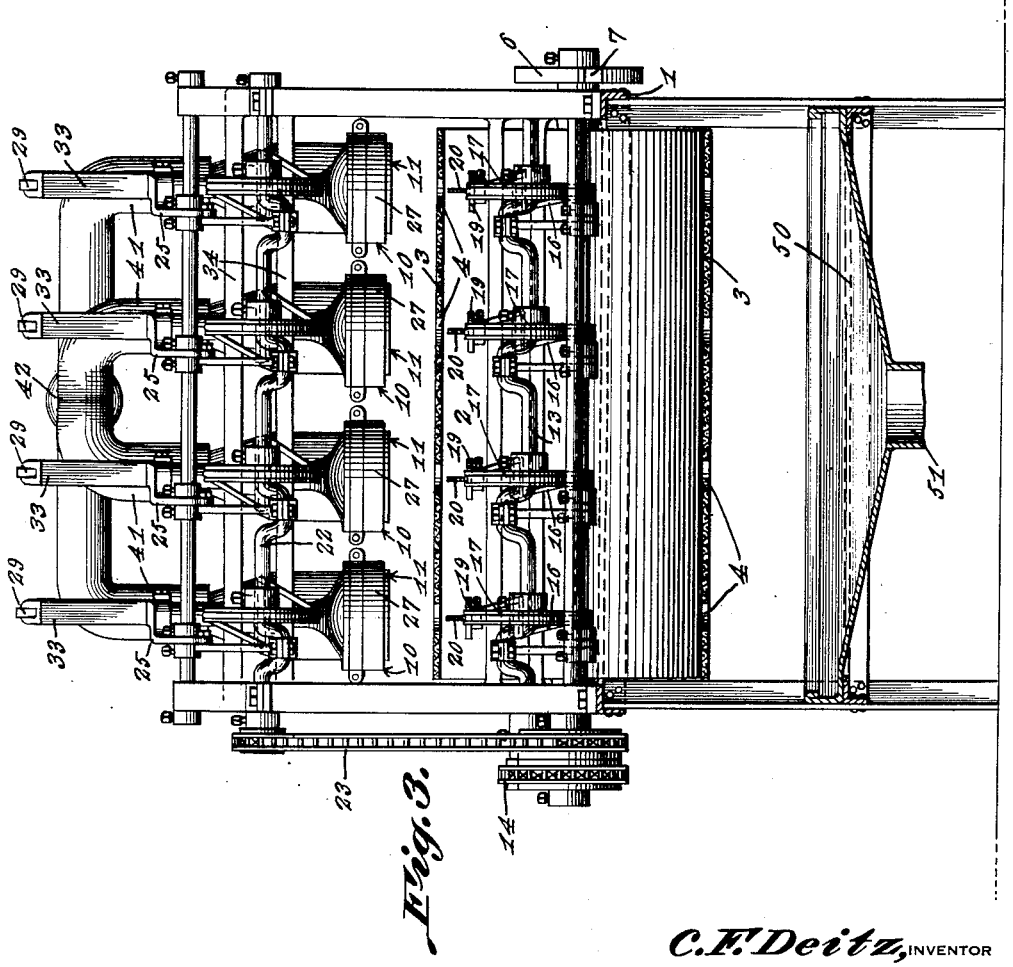
C. F. Deitz, INVENTOR
BY Victor J. Evans & Co.
ATTORNEY Aug. 22, 1933.  C. F. DEITZ  1,923,712
TOMATO CORING AND PEELING MACHINE
Filed March 22, 1932   4 Sheets-Sheet 4
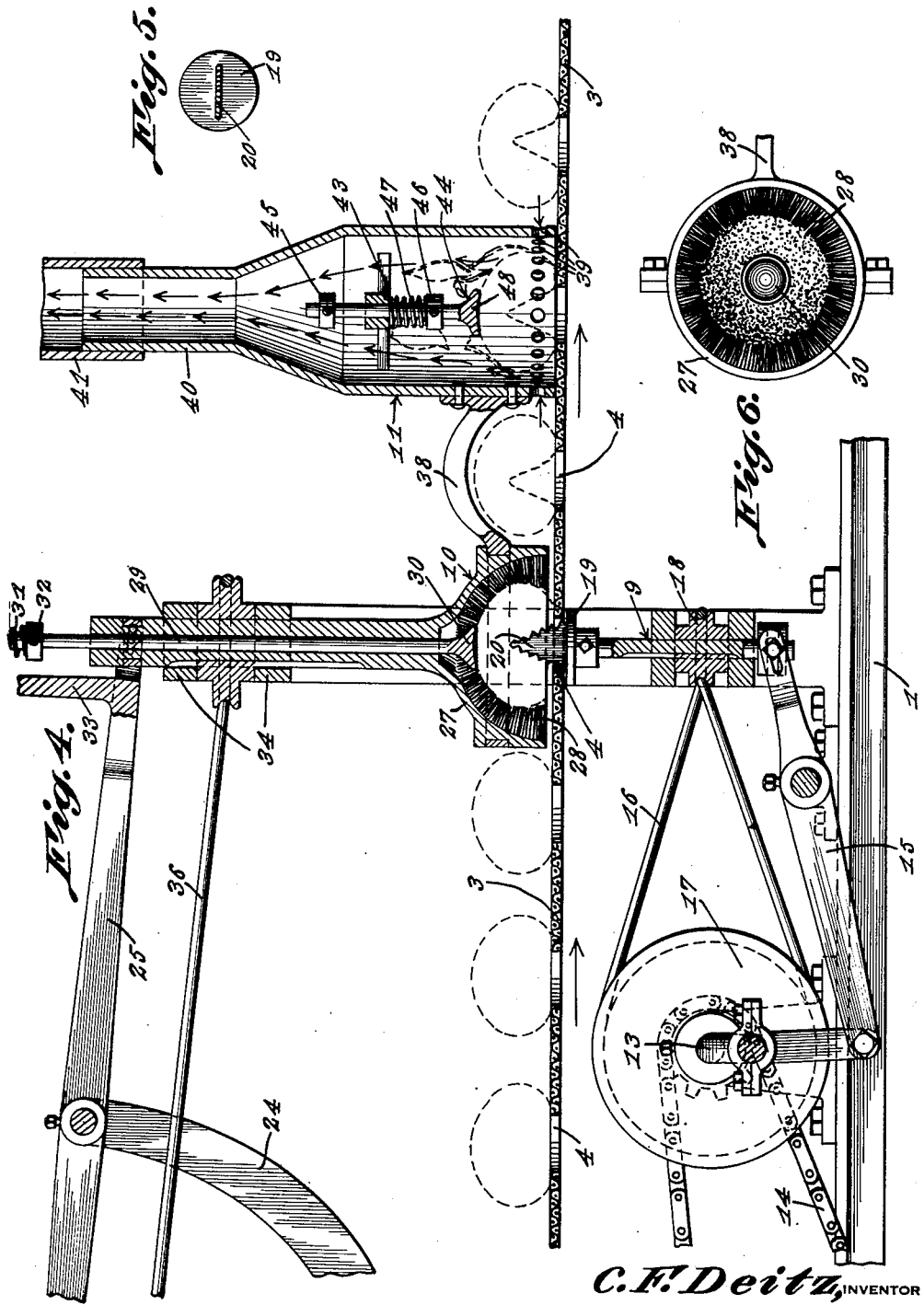
C. F. Deitz, INVENTOR
BY Victor J. Evans & Co.
ATTORNEY Patented Aug. 22, 1933

1,923,712

UNITED STATES PATENT OFFICE 1,923,712

TOMATO CORING AND PEELING MACHINE

Charles F. Deitz, Miami, Fla., assignor to Victor N. Adams, Miami, Fla.

Application March 22, 1932. Serial No. 600,509

5 Claims. (Cl. 146—38)

This invention relates to tomato coring and peeling machines especially adapted for canneries and has for the primary object, the provision of a device of the above stated character, whereby scalded tomatoes taken from a scalding device may be easily and quickly acted on to remove therefrom the cores and skins and deliver the tomatoes firm and ready for canning, thereby rendering a large saving in manual power and time.

Another object of this invention is the provision of an endless carrier to receive the tomatoes and convey them to and from coring and peeling means and without mutilation so that the tomatoes remain firm, ready for canning.

A further object of this invention is the provision of means for removing cores from tomatoes and simultaneously loosening the skins thereof.

A still further object of this invention is the provision of means for pneumatically removing the skins after they have been loosened from the tomatoes so that the pulp of the tomatoes remains firm and non-mutilated.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a side elevation partly in section illustrating a tomato coring and peeling machine constructed in accordance with my invention.

Figure 3 is a transverse sectional view taken on the line 3—3 of Figure 1.

Figure 4 is an enlarged fragmentary vertical sectional view illustrating tomatoes being cored and the skins loosened and later removing them therefrom by pneumatic means.

Figure 5 is a bottom plan view illustrating a tomato holding device employed in the pneumatic means.

Figure 6 is a bottom plan view illustrating a device for loosening the skin of the tomato.

Figure 7 is a detail view illustrating one of the suction nozzles.

Figure 8 is a detail sectional view taken on the line 8—8 of Figure 1.

Figure 1:
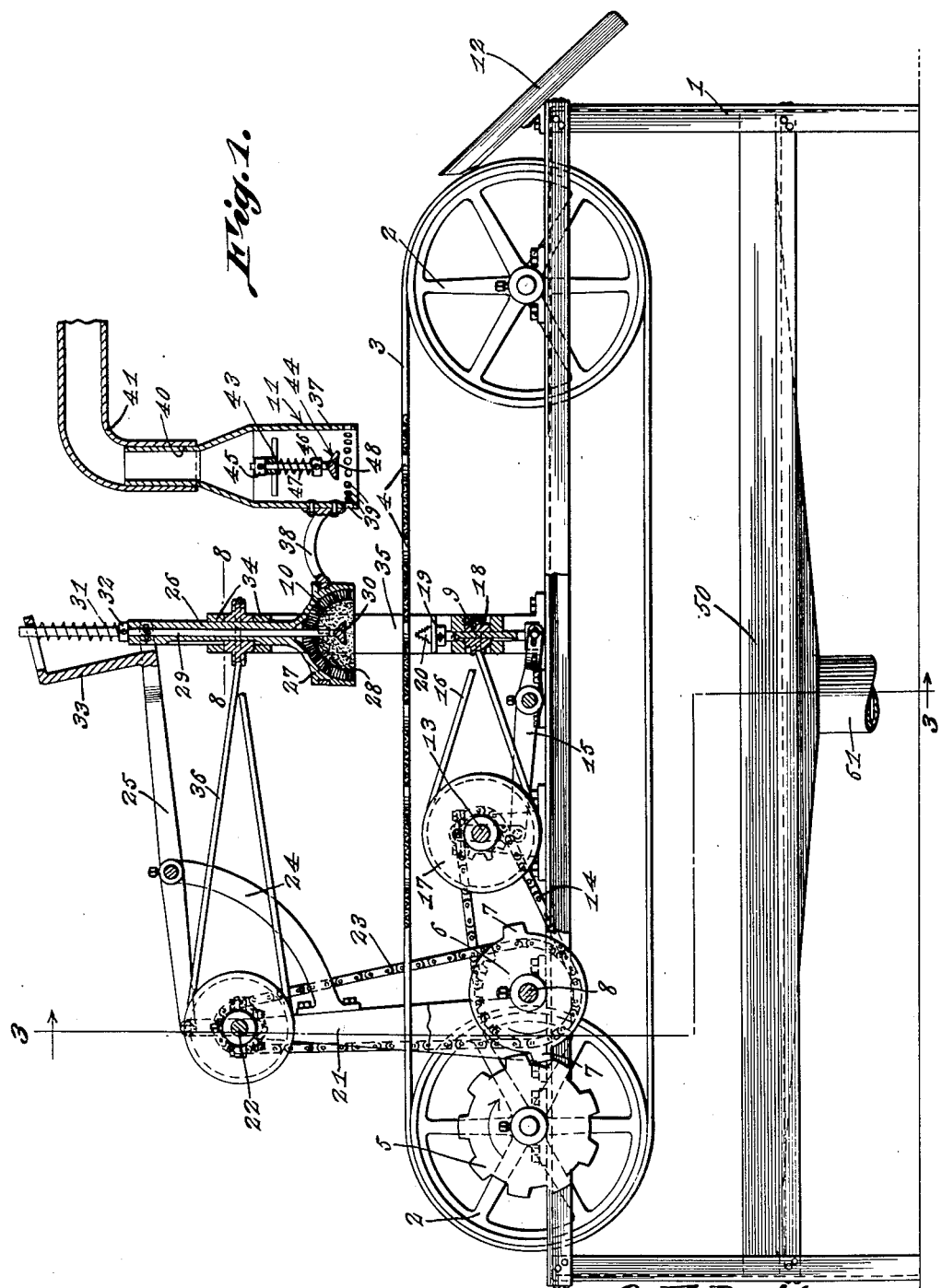
Figure 2:
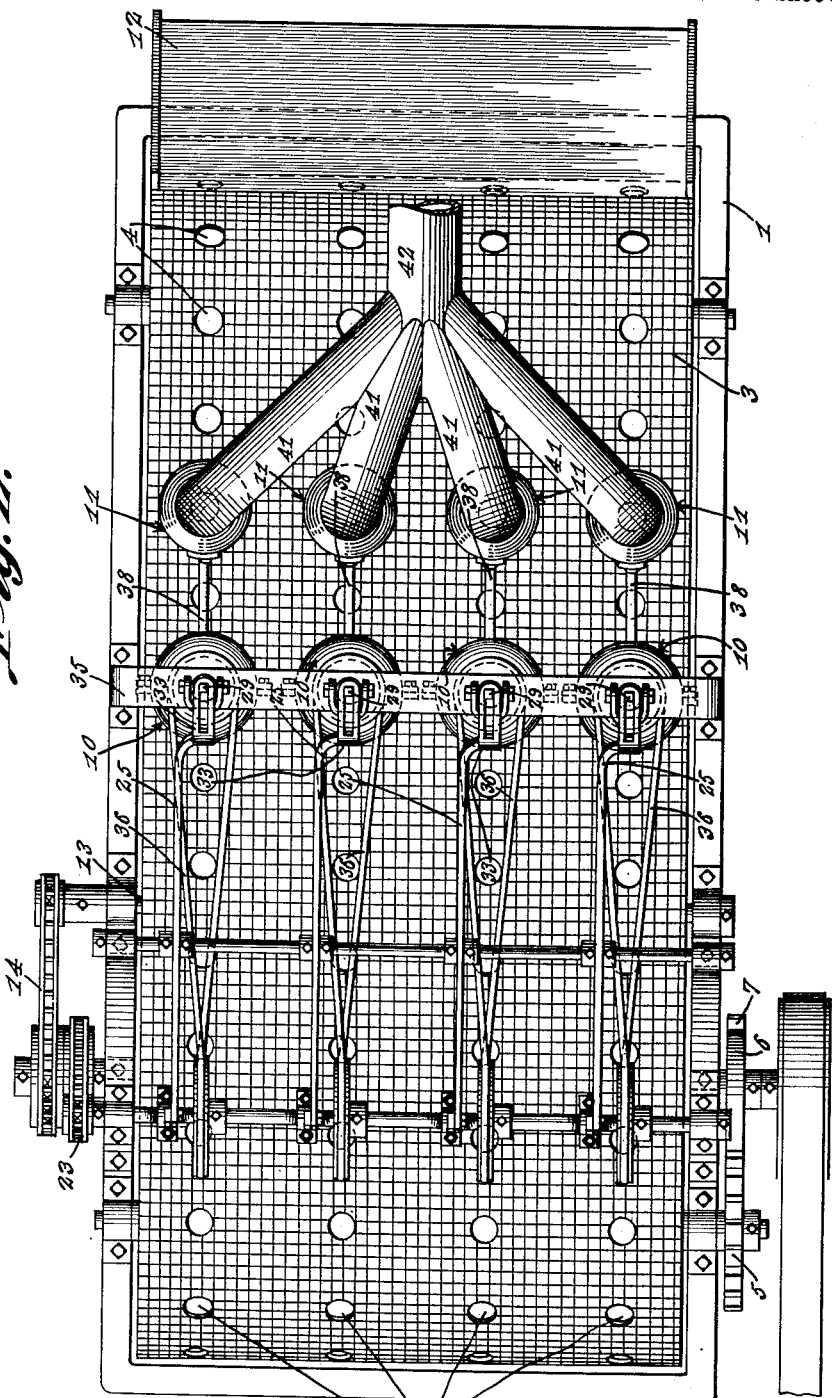
Figure 2 is a top plan view illustrating the same.

Referring in detail to the drawings, the numeral 1 indicates a supporting structure or table rotatably supporting spaced drums 2 having trained thereover an endless conveyor 3 constructed of any material suitable for the purpose and is provided with series of tomato receiving openings 4 arranged in parallel rows. The conveyor is adapted to move in the direction indicated by the arrows in Figure 4 and one of the drums 2 has secured thereto a gear 5 given an intermittent rotation by a gear 6 having oppositely disposed teeth 7, thus it will be seen that the conveyor is moved by a step-by-step movement. The gear 6 is secured to a power shaft 8 journalled to the supporting structure 1 and driven by any suitable power means. Tomatoes taken from the scalding device may be placed within the openings 4 upon the upper run of the conveyor and as the tomatoes move toward the discharge end of the machine they are cored by coring mechanisms 9 and simultaneously the skins are loosened by rotating brushes 10 and the loosened skins removed by pneumatic suction devices 11 so that the tomatoes discharged from the machine by way of the chute 12 are ready for canning with the pulp thereof firm and non-mutilated.

A crank shaft 13 is journalled to the supporting structure 1 and is driven from the power shaft 8 by sprocket gears and a sprocket chain 14. The cranks of the crank shaft are connected to pivotally mounted levers 15 having their free ends pivotally and slidably connected to the coring devices 9 which are located below the upper run of the conveyor 3 so that when the tomatoes seated within the openings stop directly above the coring devices 9, the latter are elevated so as to act on the tomatoes. The coring devices 9 are rotated by belts 16 trained over pulleys 17 secured to the crank shaft 13 and over pulleys 18 secured to the coring devices. Each of the coring devices consists of a rotatably and slidably mounted shaft having its lower end pivotally and slidably connected to its respective lever 15 and carrying at its upper end a coring head 19. The head 19 includes a serrated conical shaped portion 20 adapted to bore into the tomato for removing therefrom the core.

Vertical supporting posts 21 are carried by the supporting structure 1 and rotatably support a crank shaft 22 driven by a sprocket chain 23 receiving its power from the power shaft 8. Supporting arms 24 are carried by the posts 21 and pivotally support rocker arms 25 which are connected to the cranks of the crank shaft 22. The free ends of the rocker arms 25 have journalled therein the skin loosening devices 10 and the latter each consists of a hollow member 26 and terminating at its lower end in a cup shaped element 27 adapted to fit over a tomato and provided upon its inner face with bristles 28 adapted to come in contact with the skin of the tomato. The bristles 28 themselves form a cup shaped opening to receive the tomato and due to the bristles, tomatoes of different sizes may be accommodated. A rod 29 is slidable through the hollow member 26 and its lower end is enlarged to form a tomato holding head 30 located within the opening defined by the bristles and has its lower face concave. The rod 29 is yieldably supported in its lowermost position by a spring 31 engaging a collar 32 secured to the rod and a bracket 33 carried by the rocker arm 25. The hollow members 26 are slidably mounted in bearings 34 carried by a supporting structure 35 mounted on the supporting structure 1. The hollow members 26 are rotated from the crank shaft 22 by endless belts 36.

The skin loosening devices 10 are located directly above the coring devices 9 so that when the latter move upwardly to core a tomato, the skin loosening devices move downwardly over the tomatoes retaining them in contact with the conveyor while being cored and as the cup shaped elements 27 carrying the bristles 28 are rotated, the bristles loosen the skins from the tomatoes. The tomatoes holding heads 30 engage the tomatoes with sufficient force to keep them seated on the conveyor but are capable of yielding to prevent squashing or mutilating the tomatoes.

The suction devices 11 are in the form of nozzles 37 having secured thereto arms 38 which are in turn journalled to the skin loosening devices 10. The nozzles 37 are opened at their lower ends and provided in the walls thereof with a series of openings 39 while their upper ends are reduced to form necks 40 slidably received in suction pipes 41 connected to a main suction pipe 42. Spiders 43 are mounted within the nozzles 37 and slidably support tomato holding devices 44 each consisting of a rod slidable in its respective spider and limited in its downward movement by a collar 45. A collar 46 is secured to the rod and is engaged by a spring 47 which also engages the spider. The lower end of the rod is provided with a head 48 having a concave face to engage the tomato and is also provided with a slot 49. The tomato holding device 44 is under sufficient tension to prevent the tomato from being lifted off the conveyor by suction.

The tomato leaving the coring and skin loosening devices passes under the nozzles and as the nozzles move downwardly with the skin removing devices, the loosened skins of the tomatoes will be removed from the pulp by the suction and taken off through the pipes 41 for collection in any suitable way. As shown in Figure 4 the tomatoes on reaching the chute 12 have been cored and removed of their skins ready for canning.

A drain pan 50 is located on the supporting structure 1 below the conveyor for the purpose of catching the tomato juices from the tomatoes while being acted on and the juices drained from the pan by a pipe 51.

From the foregoing description taken in connection with the accompanying drawings it will be seen that a machine has been provided which can be easily installed in a cannery between the scalding device and the tomato canning machine for the purpose of removing from the scalded tomatoes their cores and skins without mutilating the pulp so that the tomatoes will be in a firm condition when arriving at the canning machine. It will also be noted that this machine is capable of materially reducing man-power and the time which it takes to prepare tomatoes after being scalded for canning.

While I have shown and described the preferred embodiment of my invention, it will be understood that minor changes in construction, combination and arrangement of parts may be made without departing from the spirit and scope of my invention, as claimed.

Having thus described my invention, what I claim is:

1. A machine for coring and peeling tomatoes comprising a supporting structure, an endless conveyor on said structure and having openings to form seats for receiving tomatoes, means for driving said conveyor in a step-by-step movement, rotatably and slidably mounted coring devices on said supporting structure movable into and out of the openings to remove cores from the tomatoes, rotatably and slidably mounted cup shaped elements on said supporting structure to fit over the tomatoes while being cored, bristles carried by said cup shaped elements to loosen the skins of the tomatoes, and a pneumatic means connected to and slidable with the cup-shaped elements for removing the loosened skins from the tomatoes.

2. A machine for coring and peeling tomatoes comprising a supporting structure, an endless conveyor on said supporting structure and having openings to form seats to receive tomatoes, rotatably and reciprocally mounted coring elements carried by said supporting structure for acting on said tomatoes through the openings to remove cores therefrom, cup shaped elements rotatably and slidably mounted on said supporting structure to receive the tomatoes when being cored, bristles in said cup shaped elements to loosen the skins of the tomatoes, and suction nozzles carried by the cup shaped elements to act upon the tomatoes after leaving said cup shaped elements to remove the loosened skins therefrom.

3. A machine for coring and peeling tomatoes comprising a supporting structure, an endless conveyor on said structure and having openings to form seats for receiving tomatoes, means for driving said conveyor in a step-by-step movement, reciprocally and rotatably mounted coring elements carried by said supporting structure to remove cores from the tomatoes by way of said openings, means for reciprocating and rotating said elements, cup shaped elements rotatably and reciprocally mounted on said supporting structure to fit over the tomatoes when being cored, means for reciprocating and rotating the cup shaped elements, bristles carried by the cup shaped elements to loosen the skins on the tomatoes, and pneumatic means connected to and slidable with the cup-shaped elements for acting on the tomatoes to remove the loosened skins therefrom.

4. A machine for coring and peeling tomatoes comprising a supporting structure, an endless conveyor on said structure and having openings to form seats for receiving tomatoes, means for driving said conveyor in a step-by-step movement, reciprocally and rotatably mounted coring elements carried by said supporting structure to remove cores from the tomatoes by way of said openings, means for reciprocating and rotating said elements, cup shaped elements rotatably and reciprocally mounted on said supporting structure to fit over the tomatoes when being cored, means for reciprocating and rotating the cup shaped elements, bristles carried by the cup shaped elements to loosen the skins on the tomatoes, pneumatic means connected to and slidable with said cup-shaped elements for acting on the tomatoes to remove the loosened skins therefrom, and yieldable means in said cup shaped elements to engage and hold the tomatoes against the conveyor.

5. A machine for coring and peeling tomatoes comprising a supporting structure, an endless conveyor on said structure and having openings to form seats for receiving tomatoes, means for driving said conveyor in a step-by-step movement, reciprocally and rotatably mounted coring elements carried by said supporting structure to remove cores from the tomatoes by way of said openings, means for reciprocating and rotating said elements, cup shaped elements rotatably and reciprocally mounted on said supporting structure to fit over the tomatoes when being cored, means for reciprocating and rotating the cup shaped elements, bristles carried by the cup shaped elements to loosen the skins on the tomatoes, pneumatic means connected to and slidable with said cup-shaped elements for acting on the tomatoes to remove the loosened skins therefrom, yieldable means in said cup shaped elements to engage and hold the tomatoes against the conveyor, and yieldable means in the pneumatic means for engaging and holding the tomatoes on the conveyor during the removal of the skins therefrom.

CHARLES F. DEITZ.